(12) United States Patent
Higuchi et al.

(10) Patent No.: US 8,614,993 B2
(45) Date of Patent: Dec. 24, 2013

(54) USER TERMINAL APPARATUS AND BASE STATION APPARATUS

(75) Inventors: Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1218 days.

(21) Appl. No.: 12/447,609

(22) PCT Filed: Oct. 30, 2007

(86) PCT No.: PCT/JP2007/071139
§ 371 (c)(1),
(2), (4) Date: Jun. 24, 2009

(87) PCT Pub. No.: WO2008/053895
PCT Pub. Date: Aug. 5, 2008

(65) Prior Publication Data
US 2009/0310549 A1   Dec. 17, 2009

(30) Foreign Application Priority Data
Nov. 1, 2006   (JP) .................... 2006-298314

(51) Int. Cl.
*H04W 72/00* (2009.01)

(52) U.S. Cl.
USPC ............ 370/335; 370/329; 370/208; 370/336

(58) Field of Classification Search
USPC ......................... 370/335, 208, 336
See application file for complete search history.

(56) References Cited

U.S. PATENT DOCUMENTS

| | | | |
|---|---|---|---|
| 2007/0091787 A1* | 4/2007 | Kwon et al. | 370/208 |
| 2007/0183386 A1* | 8/2007 | Muharemovic et al. | 370/344 |
| 2008/0043708 A1* | 2/2008 | Muharemovic et al. | 370/348 |
| 2009/0262653 A1* | 10/2009 | Toda et al. | 370/252 |
| 2009/0268695 A1* | 10/2009 | Zhao et al. | 370/336 |
| 2010/0157937 A1* | 6/2010 | Muharemovic et al. | 370/330 |

FOREIGN PATENT DOCUMENTS

| | | |
|---|---|---|
| EP | 1 936 850 A1 | 6/2008 |
| WO | 2007/052767 A1 | 5/2007 |

OTHER PUBLICATIONS

Y. Ofuji, et al., "Nobori Link Single Carrier FDMA ni Okeru UE no Group-goto ni CQI Sokuteiyo Pilot Channel no Soshin Taiiki o Bunri suru Shuhasu Ryoiki Sucheduling-ho," ("Frequency Domain Channel-Dependent Scheduling with Group-wised Allocation of Transmission Bandwidth of Pilot Channel for CQI Measurement in Single-Carrier FDMA-Based Evolved UTRA Uplink"), IEICE Technical Report, vol. 106, No. 305, The Institute of Electronics, Information and Communication Engineers, Oct. 12, 2006, pp. 125 to 130, 7 pages.

(Continued)

*Primary Examiner* — Man Phan
*Assistant Examiner* — Pamit Kaur
(74) *Attorney, Agent, or Firm* — Osha Liang LLP

(57) ABSTRACT

A user terminal apparatus that transmits to a base station apparatus a pilot channel at least in uplink by a single carrier method is provided with a mapping portion that maps transmission data to a long block of a sub-frame composed of plural short blocks and plural of the long blocks, and maps a pilot channel for demodulating a data channel and a pilot channel for measuring a CQI to the short blocks in accordance with a transmission band and a transmission method provided by notification from the base station.

15 Claims, 18 Drawing Sheets

(56) References Cited

OTHER PUBLICATIONS

K. Higuchi, et al., "Evolved UTRA ni Okeru Butsuri Channel Kosei no Gaiyo" ("Overview of Physical Channel Structure in Evolved UTRA"), 2006 Nen IEICE Communications Society Conference Koen Ronbunshu 1, The Institute of Electronics, Information and Communication Engineers, Sep. 7, 2006, p. 389, with partial translation, 4 pages.

T. Kawamura, et al., "Single Carrier FDMA o Mochiiru Evolved UTRA Nobori Link ni Okeru FDMA to CDMA o Heiyo suru Chokko Pilot Channel" ("Orthogonal Pilot Channel Employing Combination of FDMA and CDMA in Single-Carrier FDMA-Based Evolved UTRA Uplink"), IEICE Technical Report, vol. 106, No. 168, The Institute of Electronics, Information and Communication Engineers, Jul. 12, 2006, pp. 269 to 274, 7 pages.

NTT DoCoMo, "Physical Channels and Multiplexing in Evolved UTRA Uplink," 3GPP TSG RAN WG1 Ad Hoc on LTE, R1-050591, Jun. 21, 2005, pp. 1-21, 21 pages.

3GPP TR 25.814 V7.0.0, Jun. 2006, "Physical layer aspects for evolved Universal Terrestrial Radio Access (UTRA)," 126 pages.

International Search Report issued in PCT/JP2007/071139, mailed on Feb. 5, 2008, with translation, 6 pages.

Written Opinion issued in PCT/JP2007/071139, mailed on Feb. 5, 2008, 6 pages.

\* cited by examiner

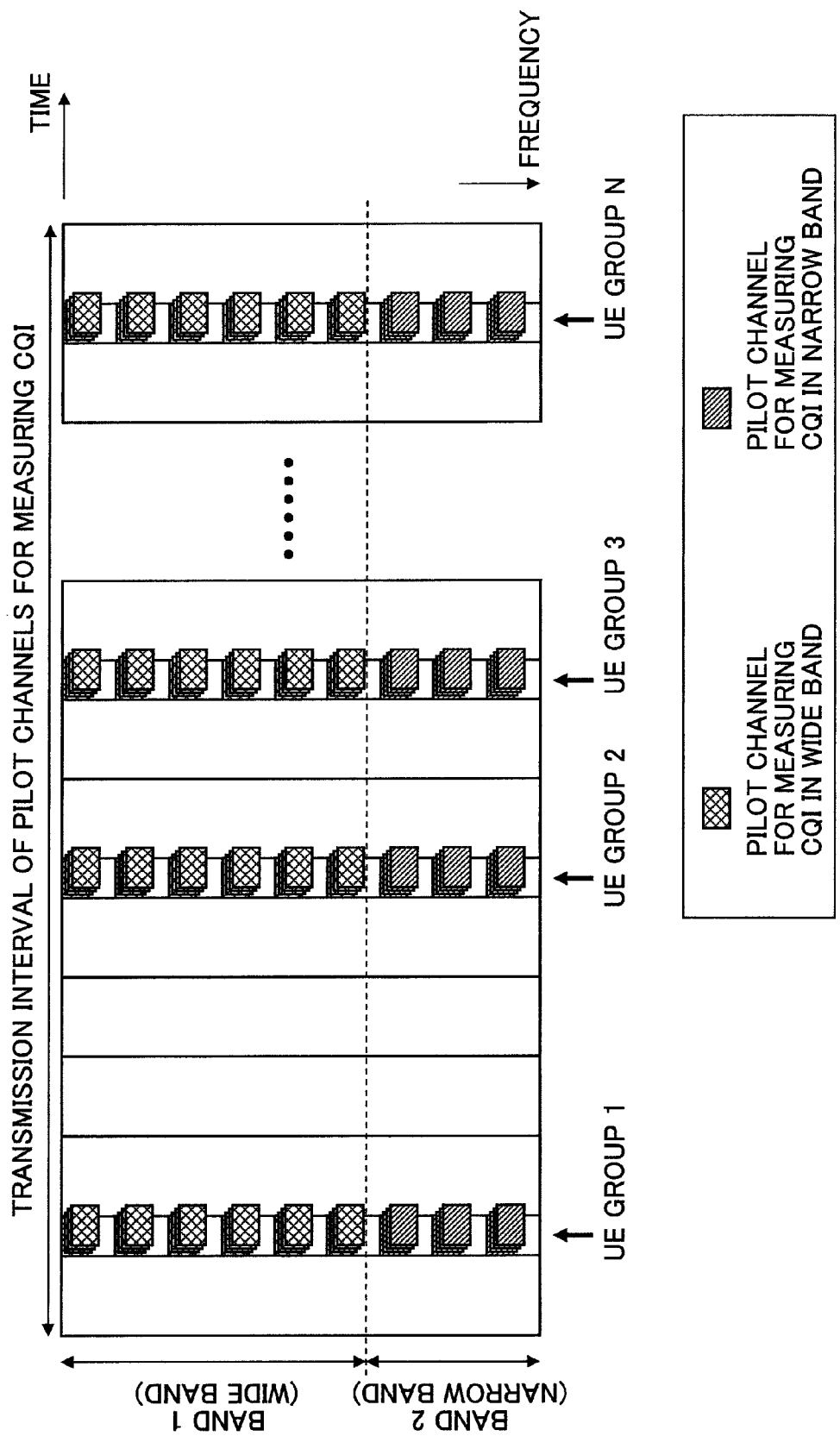

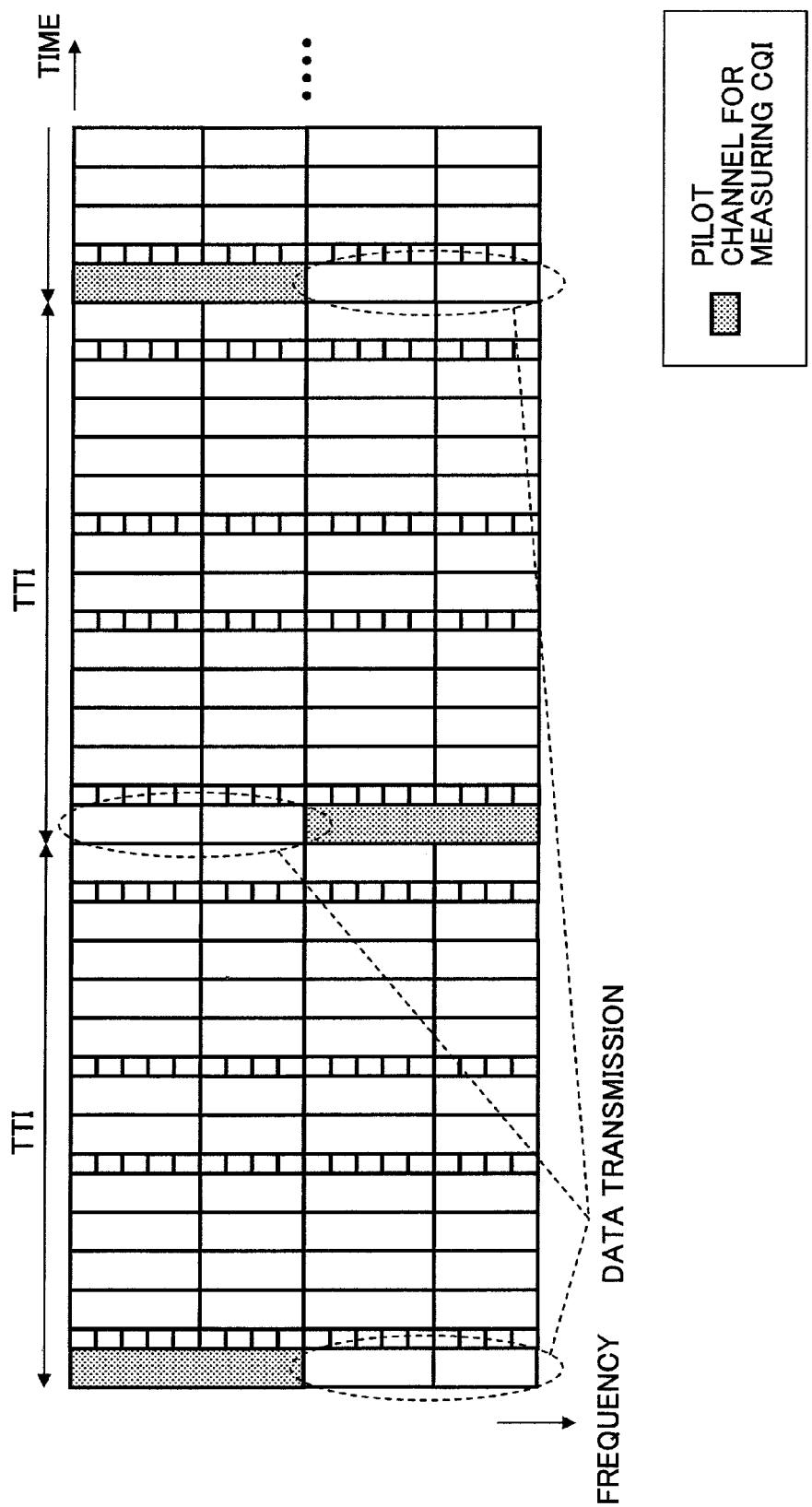

USER TERMINAL APPARATUS AND BASE STATION APPARATUS

TECHNICAL FIELD

The present invention relates to a Long Term Evolution (LTE) system, and specifically to a user terminal apparatus and a base station apparatus.

BACKGROUND ART

A communications method as a successor of W-CDMA and HSDPA, namely, Long Term Evolution (LTE) has been considered by a W-CDMA standardization organization 3GPP. As a radio access method, Orthogonal Frequency Division Multiplexing (OFDM) is under consideration for downlink, and Single-Carrier Frequency Division Multiple Access is under consideration for uplink (see 3GPP TR 25.814 (V7.0.0), "Physical Layer Aspects for Evolved UTRA," June 2006, for example).

In OFDM, a frequency band is divided into plural narrow frequency bands (sub-carriers), and data are placed on the respective divided frequency bands, so that the transmission is carried out. The sub-carriers are densely arranged in a frequency direction, allowing the sub-carriers to be partly overlapped without causing interference, thereby realizing high speed transmission and improving frequency usage efficiency.

In SC-FDMA, a frequency band is divided into plural narrow bands, and different narrow bands are used by different users, so that interference between the user terminals can be reduced. According to SC-FDMA, which is characterized in that variations in the transmission electric power are reduced, a large coverage area and low energy consumption can be realized.

SUMMARY OF INVENTION

Problems to be Solved by the Invention

However, the above-mentioned background art has the following problems.

Regarding the uplink transmission, it has been considered that two short blocks (SB) and six long blocks (LB) are used in each sub-frame as shown in FIG. 1. The long block is mainly used to transmit data and control information. The two short blocks are used to transmit a reference signal (pilot signal) for data-demodulation, the reference signal being transmitted through a band smaller than a wide band used for a CQI measurement and/or CQI measurement signal.

Because one TTI is composed of two sub-frames, one TTI is composed of four short blocks and twelve long blocks as shown in FIG. 2.

Requirements for a multiplexing method of the pilot signal may include reducing overhead of the pilot channel, making the number of pilot signal sequences as large as possible, and avoiding degradation of channel estimation accuracy.

In uplink, a Constant Amplitude Zero Auto Correlation (CAZAC) sequence, for example, is used as a sequence of the pilot channel. In the CAZAC sequence, the number of sequences is limited, while being excellent in self and mutual correlation characteristics. The number of sequences is proportional to the length of the CAZAC sequence.

The present invention has been made in view of the above problems, and is directed to a user terminal apparatus and a base station apparatus that are capable of reducing the overhead of the pilot channel and efficiently transmitting data.

Means of Solving the Problems

In order to solve the above problems, an embodiment of the present invention provides a user terminal apparatus that transmits to a base station apparatus a pilot channel at least in uplink by a single carrier method. The user terminal apparatus includes a mapping portion that maps transmission data to a long block of a sub-frame composed of plural short blocks and plural of the long blocks, and maps a pilot channel for demodulating a data channel and a pilot channel for measuring a CQI to the short block in accordance with a transmission band and a transmission method provided by notification from the base station.

With such a configuration, overhead of the pilot channel can be reduced and transmission efficiency can be increased.

Another embodiment of the present invention provides a user terminal apparatus that transmits to a base station a pilot channel at least in uplink by a single carrier method. The user terminal apparatus includes a mapping portion that maps transmission data and a pilot channel for measuring a CQI to a long block of a sub-frame composed of plural short blocks and plural of the long blocks, and maps a pilot channel for demodulating a data channel to a short block in accordance with a transmission band and a transmission method provided by notification from the base station.

With such a configuration, the number of sequences of the pilot signal can be increased compared with the preceding configuration, and thus sequences between cells can easily be reused, although the overhead of the pilot channel is slightly increased.

Yet another embodiment of the present invention provides a base station apparatus that receives pilot channels from plural users at least in uplink by a single carrier method, wherein radio resources are assigned to corresponding user terminal apparatuses in accordance with corresponding pieces of information on channel qualities in the corresponding terminal apparatuses. The base station apparatus includes a parameter determination portion that determines a parameter so that the pilot channels are orthogonal with each other between the user terminal apparatuses existing in a cell covered by the base station; and a notifying portion that notifies each of the user terminal apparatuses of the parameter.

With such a configuration, the overhead of the pilot channel to be transmitted by the user terminal apparatus can be reduced, and transmission efficiency is improved. In addition, because the number of sequences of the pilot signal to be transmitted by the user terminal apparatus can be larger, sequences between cells can easily be reused.

Advantage of the Invention

According to embodiments of the present invention, a user terminal apparatus and a base station apparatus that are capable of reducing the overhead of the pilot channel and efficiently transmitting data are obtained.

BRIEF DESCRIPTION OF THE DRAWINGS

FIG. 17 is an explanatory view illustrating a method of multiplexing a pilot channel for measuring a CQI in a user terminal apparatus according to an example of the present invention; and FIG. 18 is an explanatory view illustrating a transmission method of a pilot channel for measuring a CQI in a user terminal apparatus according to an example of the present invention

Figure 1:
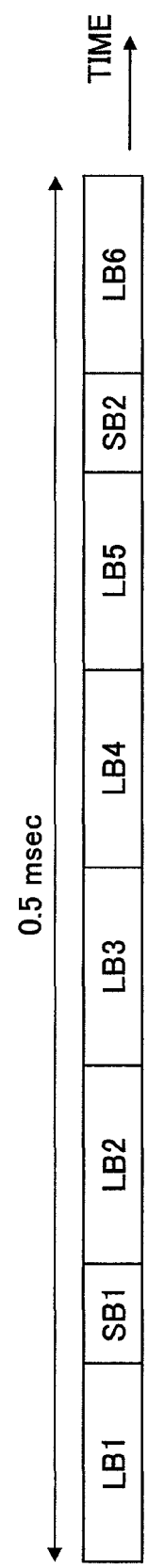
FIG. 1 is an explanatory view illustrating a sub-frame configuration.
Figure 2:
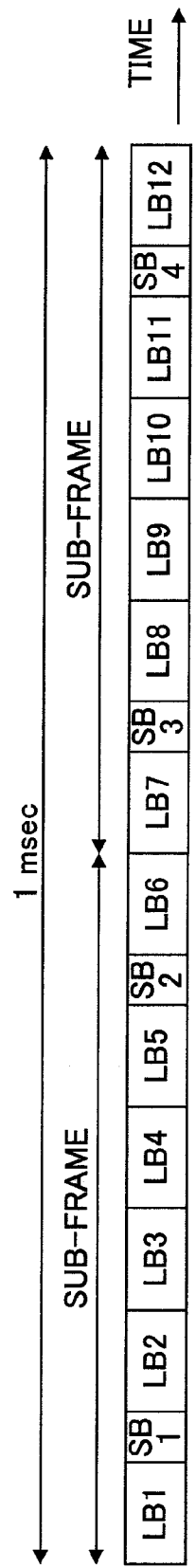
FIG. 2 is an explanatory view illustrating a TTI configuration.

LIST OF REFERENCE SYMBOLS 100 user terminal apparatus
102 channel coding portion
104 data modulation portion
106 discrete Fourier Transform portion
108 sub-carrier mapping portion
110 inverse Fast Fourier Transform portion
112 cyclic prefix addition portion
114 CAZAC code generation portion
116 cyclic shift portion
118 discrete Fourier Transform portion
120 sub-carrier mapping portion
122 inverse Fast Fourier Transform portion
124 cyclic prefix addition portion
126 downlink reception signal demodulation portion
128 multiplex portion
130 RF transmission circuit
132 electric power amplifier
134 duplexer
200 base station apparatus
202 CAZAC code generation portion
204 cyclic shift portion
206 discrete Fourier Transform portion
208 sub-carrier mapping portion
210 inverse Fast Fourier Transform portion
212 reception timing estimation portion
214 channel estimation/CQI measurement portion
216 duplexer
218 RF reception circuit
220 Fast Fourier Transform
222 sub-carrier demapping portion
224 frequency domain equalizing portion
226 inverse discrete Fourier Transform
228 demodulation portion
230 scheduler
232 code information setting portion

MODE(S) FOR CARRYING OUT THE INVENTION

Referring to the accompanying drawings, preferred embodiments of the present invention are explained in accordance with the following examples.

In all the drawings for explaining the embodiments, the same reference symbols are used for components or elements having the same functions, and repetitive explanations are omitted.

A radio communications system is explained in which a base station apparatus and a user terminal apparatus according to examples of the present invention are employed.

The radio communications system employs OFDM for downlink and SC-FDMA for uplink as radio access methods. In OFDM, a frequency band is divided into plural narrow frequency bands (sub-carriers) and data are placed on corresponding narrow frequency bands in order to carry out transmission, as stated above. In SC-FDMA, a frequency band is divided into plural narrow frequency bands and different terminals use different narrow frequency bands in order to carry out transmission, so that interference between the terminals can be reduced.

Figure 3:
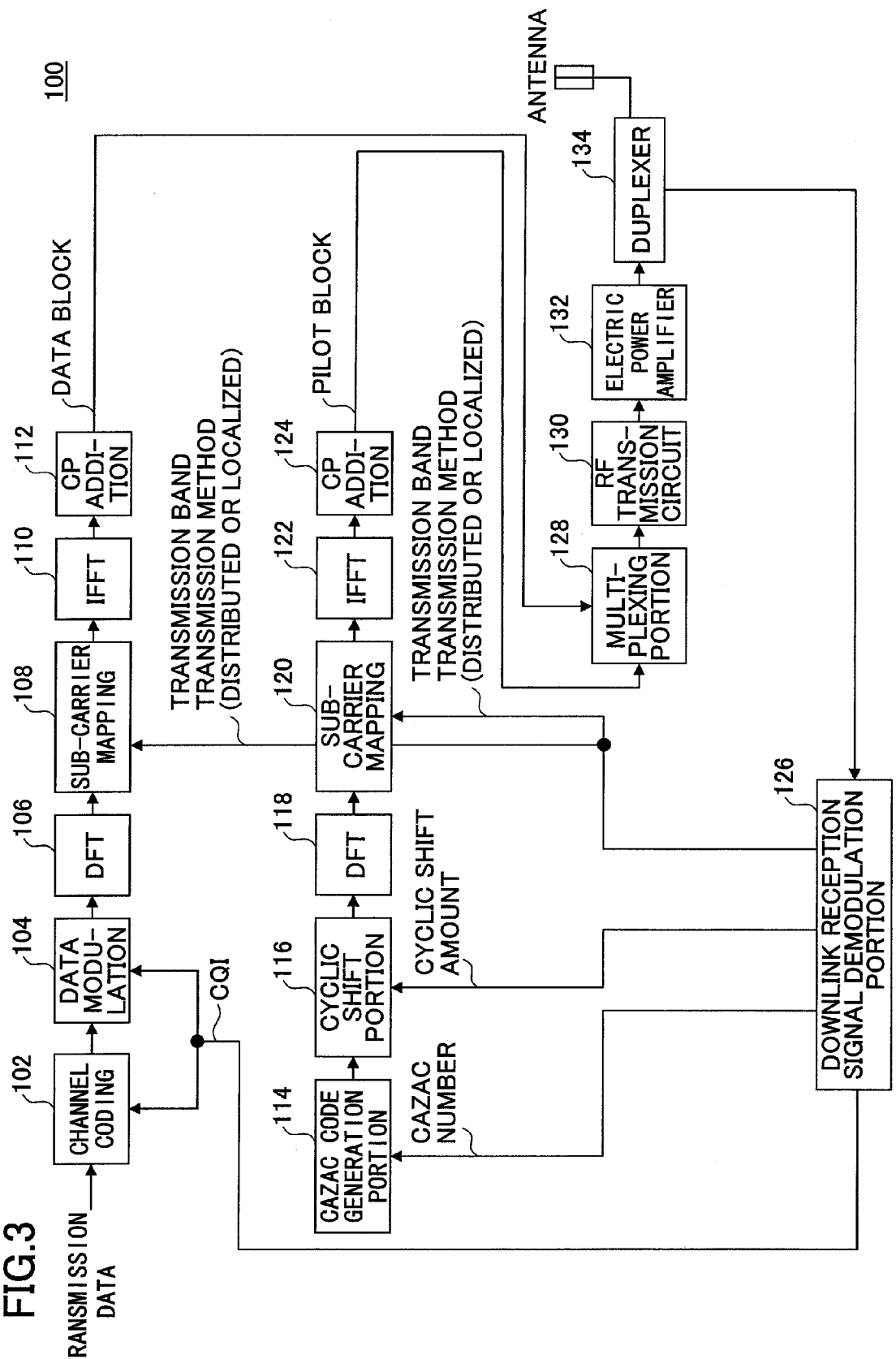
FIG. 3 is a partial block diagram illustrating a user terminal apparatus according to an example of the present invention.

Next, a user terminal apparatus 100 according to a first example of the present invention is explained in reference to FIG. 3.

The user terminal apparatus 100 according to this example includes a channel coding portion 102, a data modulation portion 104, a discrete Fourier transform portion (DFT) 106, a sub-carrier mapping portion 108, an inverse Fast Fourier transform portion (IFFT) 110, a cyclic prefix (CP) addition portion 112, a CAZAC code generation portion 114, a cyclic shift portion 116, a discrete Fourier Transform portion (DFT) 118, a sub-carrier mapping portion 120, an inverse Fast Fourier Transform portion (IFFT) 122, a cyclic prefix (CP) addition portion 124, a downlink reception signal demodulation portion 126, a multiplex portion 128, an RF transmission circuit 130, an electric power amplifier 132, and a duplexer 134.

The downlink reception signal demodulation portion 126 demodulates information indicating a condition of an uplink channel transmitted to each user terminal, the condition having been measured at a base station apparatus 200, namely, a Channel Quality Indicator (CQI). The information indicating the uplink channel condition is input to the channel coding portion 102 and the data demodulation portion 104.

In addition, the downlink reception signal demodulation portion 126 demodulates control information transmitted from the base station apparatus 200, and outputs a CAZAC code identifier, a cyclic shift amount, and a transmission band/method, which are included in the control information, to the CAZAC code generation portion 114, the cyclic shift portion 116, and the sub-carrier mapping portions 108, 120, respectively.

In the channel coding portion 102 and the data modulation portion 104, a channel coding process and a data modulation process are carried out in accordance with a combination of a coding rate and a data modulation method determined for transmission data in accordance with the channel quality indicator (CQI) by a transmission scheme that adaptively changes a transmission method and an error correction coding rate in accordance with changes in a propagation environment, namely, Adaptive Modulation and Coding (AMC).

The channel coding portion 102 carries out channel coding of the transmission data.

Figure 4:
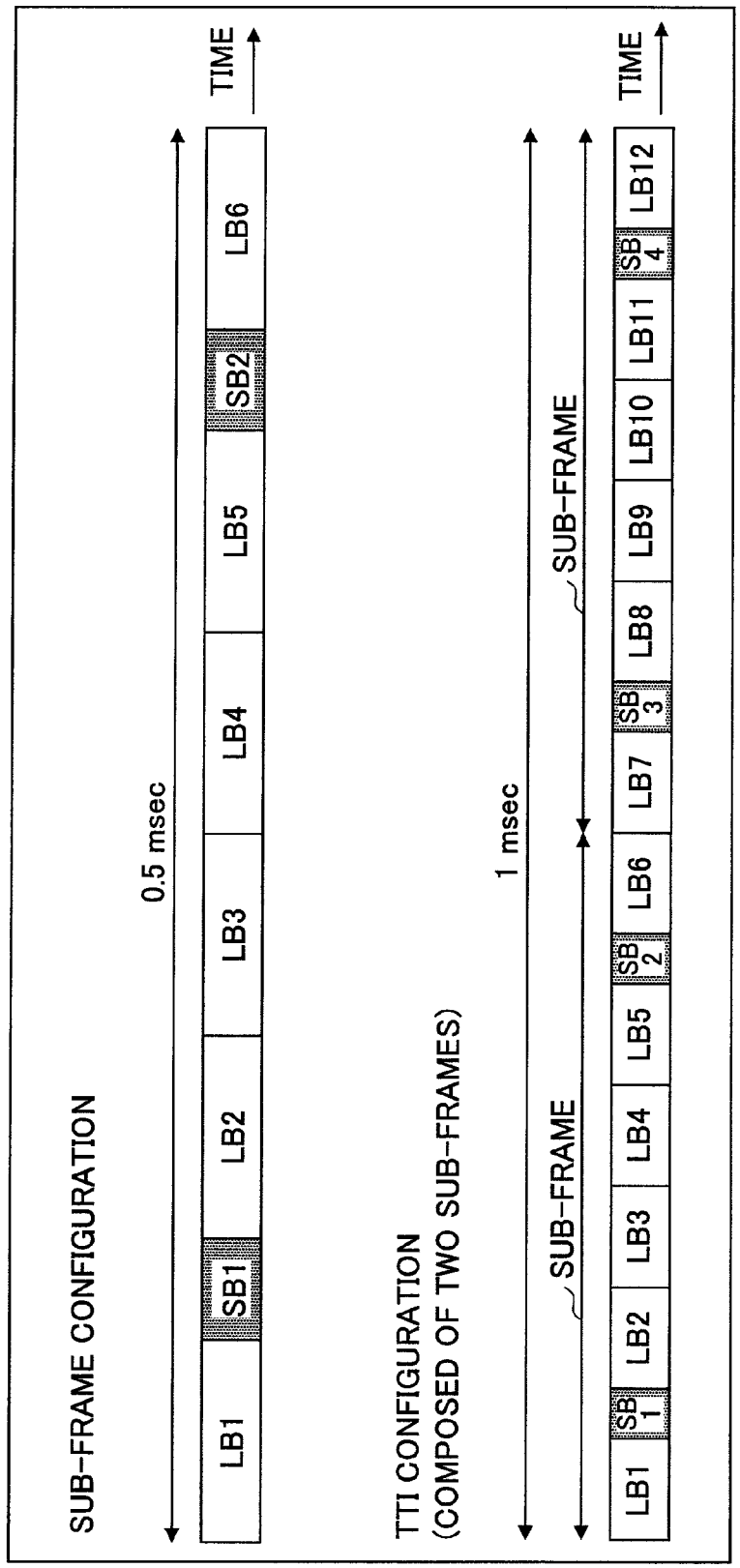
FIG. 4 is an explanatory view illustrating a TTI, a subframe, and a block.

FIG. 4 illustrates an example of a sub-frame and a Transmission Time Interval (TTI). In this illustrated example, a TTI of 1.0 ms includes two sub-frames of 0.5 ms, and each sub-frame includes six long blocks (LB) and two short blocks (SB). The long block is, for example, 66.7 μs and the short block is, for example, 33.3 μs. These values are merely examples and can be arbitrarily changed depending on necessity. Generally, the long block is used to transmit data (control channel, data channel, and the like) unknown to a transmitter, and the short block is used to transmit data (pilot channel and the like) known by a receiver. In the illustrated example, one TTI includes twelve long blocks (LB1 through LB12) and four short blocks (SB1 through SB4).

The discrete Fourier transform portion (DFT) 106 carries out discrete Fourier Transform, and thus transforms time series information into frequency domain information.

The sub-carrier mapping portion 108 carries out mapping in the frequency domain. For example, the sub-carrier mapping portion 108 carries out mapping the transmission data in accordance with the transmission band/method input from the downlink reception signal demodulation portion 126.

The input transmission method includes information indicating use of a frequency division multiplexing (FDM) method for multiplexing the plural user terminal apparatuses. In this case, the sub-carrier mapping portion 108 maps signals in accordance with the input transmission band. There are two types of the FDM methods: one is a localized FDM method and the other is a distributed FDM method. In the localized FDM method, a continuous band, namely continuous sub-carriers are assigned to each user in a frequency axis. In the distributed FDM method, the sub-carriers dispersed in the entire band are assigned. In this case, the assigned sub-carrier is designated from the dispersed sub-carriers.

The inverse Fast Fourier Transform (IFFT) portion 110 carries out the inverse Fourier Transform and reverts the frequency domain signal into the time domain signal.

The cyclic prefix (CP) addition portion 112 adds a cyclic prefix (CP) to the information to be transmitted. The cyclic prefix (CP) serves as a guard interval for absorbing a reception timing difference between the plural users in the base station and a multi-path propagation delay. An output signal of the cyclic prefix addition portion 112 is input to the multiplex portion 128 as a data block.

The CAZAC code generation portion 114 generates a CAZAC code sequence in accordance with the identifier of the CAZAC code, for example, a CAZAC number input from the downlink reception signal demodulation portion 126.

The cyclic shift portion 116 introduces another code by rearranging the CAZAC code sequence in a cyclic manner in accordance with the cyclic amount input from the downlink reception signal demodulation portion 126.

The discrete Fourier Transform portion (DFT) 118 carries out discrete Fourier Transform and thus transforms the time series information into the frequency domain information.

The sub-carrier mapping portion 120 carries out mapping in frequency domain. For example, the sub-carrier mapping portion 120 carries out mapping of the transmission data in accordance with the transmission band/method input from the downlink reception signal demodulation portion 126.

The input transmission method includes information designating application of a frequency division multiplexing (FDM) method for multiplexing the plural user terminal apparatuses. In this case, the sub-carrier mapping portion 120 maps signals in accordance with the input transmission band. There are two types of the FDM methods: one is a localized FDM method and the other is a distributed FDM method. In the localized FDM method, a continuous band, namely continuous sub-carriers are assigned to each user in a frequency axis. In the distributed FDM method, the sub-carriers dispersed in the entire band are assigned.

The inverse Fast Fourier Transform (IFFT) portion 122 carries out the inverse Fourier transform and reverts the frequency domain signal into the time domain signal.

The cyclic prefix (CP) addition portion 124 adds a cyclic prefix (CP) to the information to be transmitted. The cyclic prefix (CP) serves as a guard interval for absorbing a reception timing difference between the plural users in the base station and a multi-path propagation delay. An output signal of the cyclic prefix addition portion 124 is input to the multiplex portion 128 as a data block.

Figure 5:
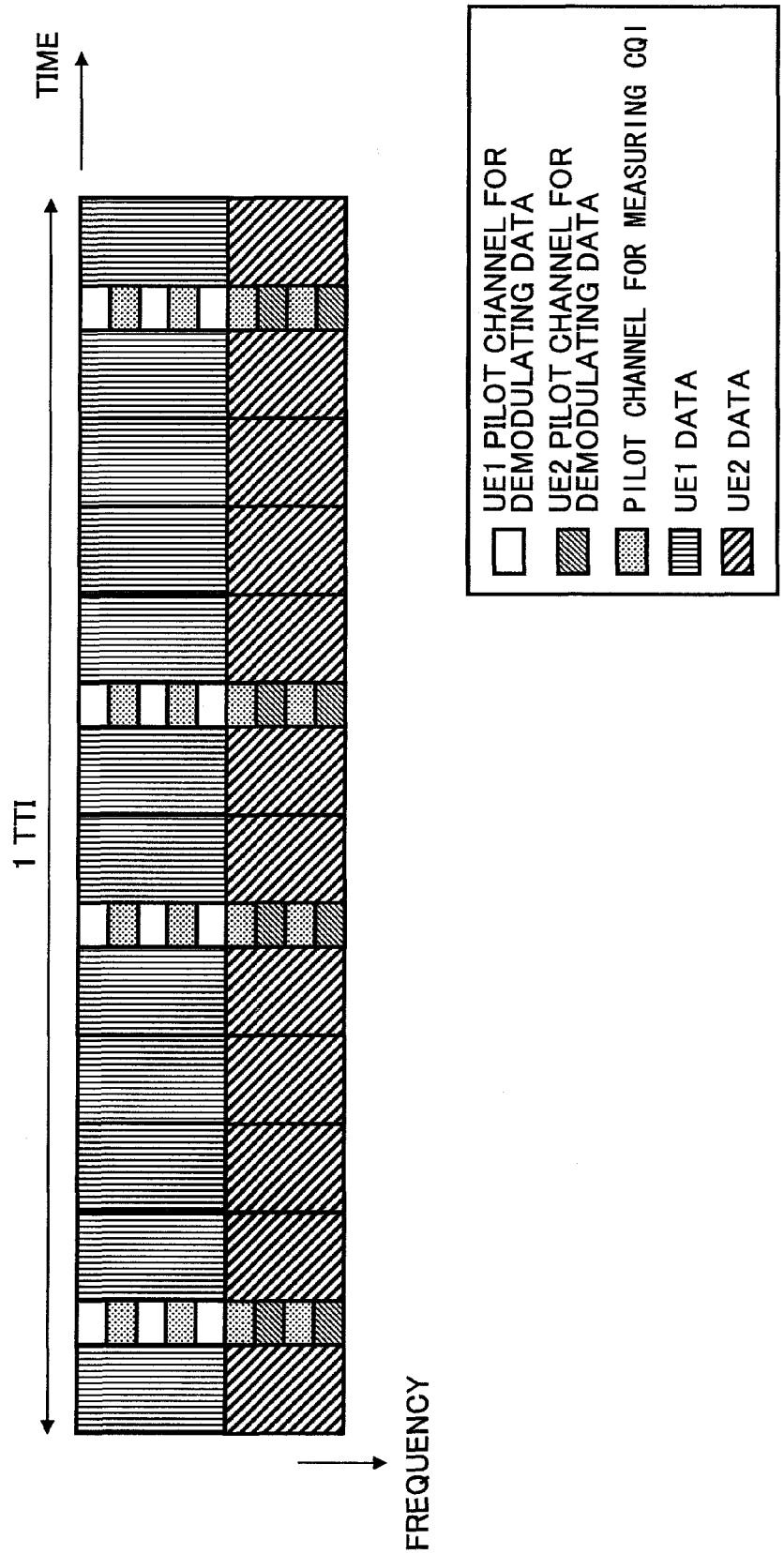
FIG. 5 is an explanatory view illustrating an example of mapping a data channel, a pilot channel for demodulating a data channel, and a pilot channel for measuring a CQI in a user terminal apparatus according to the example of the present invention.

The multiplex portion 128 multiplexes the pilot channels to the transmission data and thus generates a transmission frame. For example, the transmission data are mapped to the long blocks, and the pilot channel for demodulating a data channel and the pilot channel for measuring a CQI are mapped to the short blocks, as shown in FIG. 5. Specifically, the pilot channel for demodulating the data channel and the pilot channel for measuring the CQI are mapped to the same short blocks. In this case, the distributed FDM method is applied to multiplexing the pilot channel for demodulating the data channel and the pilot channel for measuring the CQI.

When the pilot channel for demodulating the data channel and the pilot channel for measuring the CQI are concurrently transmitted to the user that transmits data, the pilot channel for measuring the CQI is preferentially transmitted. In this case, the channel can be estimated by using a part of the pilot channel for measuring the CQI.

As stated, because the short blocks are used only to transmit the pilot channels, the overhead of the pilot channels is reduced, thereby improving transmission efficiency. In addition, because the pilot channel for measuring the CQI can be transmitted by using the four short blocks in one TTI, the number of the users whose pilot channels for measuring the CQIs are multiplexed can be increased. Moreover, because the pilot channel for demodulating the data channel is transmitted by using the four short blocks in one TTI, the channel estimation accuracy in the base station 20 can be improved.

The RF transmission circuit 130 carries out a digital to analog conversion process, a frequency conversion process, a band limitation process and the like in order to transmit the transmission symbols at a radio frequency.

The electric power amplifier 132 adjusts transmission power.

The duplexer 134 appropriately keeps a transmission signal and a reception signal separated in order to realize full-duplex communications.

Figure 6:
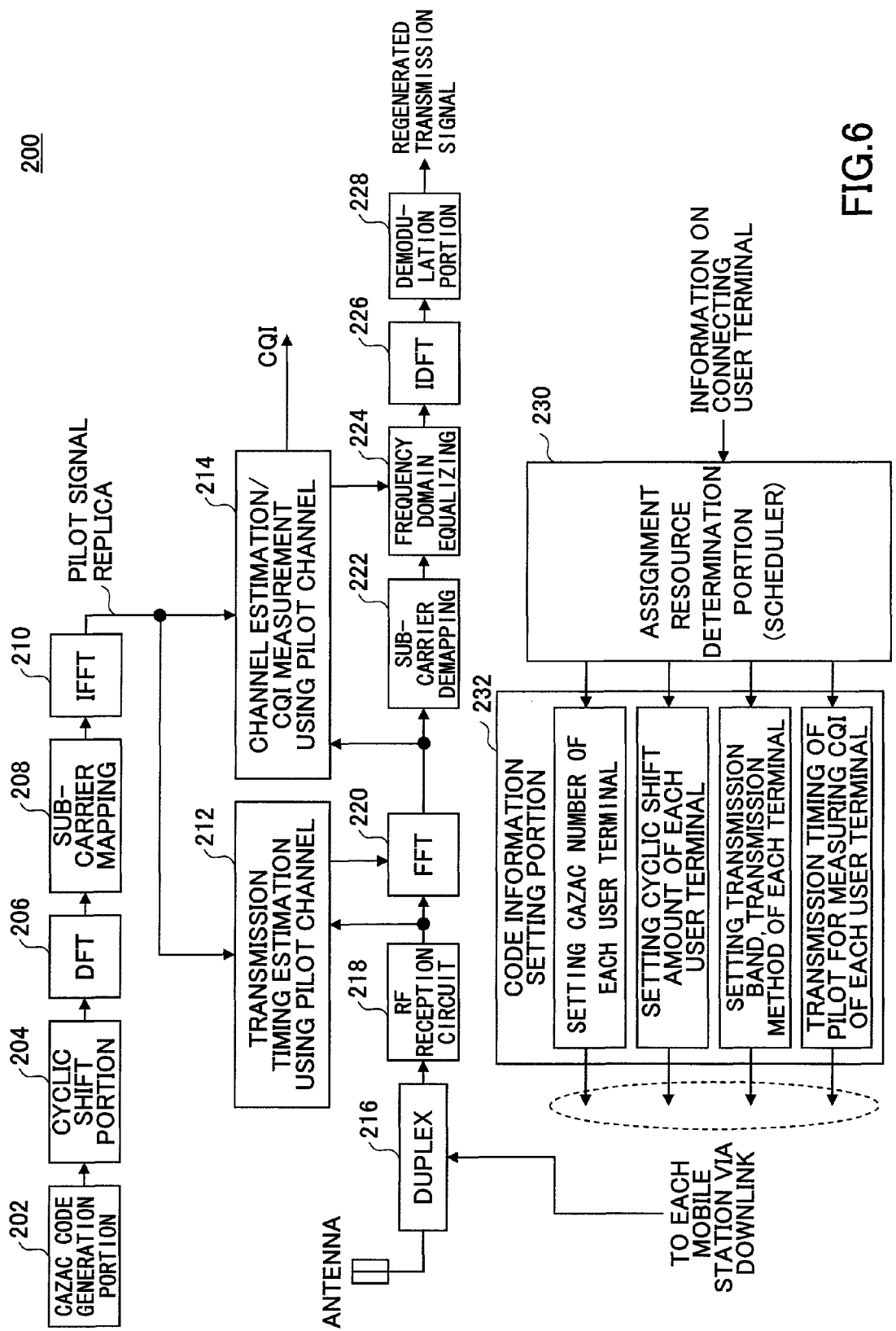
FIG. 6 is a partial block diagram illustrating a base station according to an example of the present invention.
Figure 7:
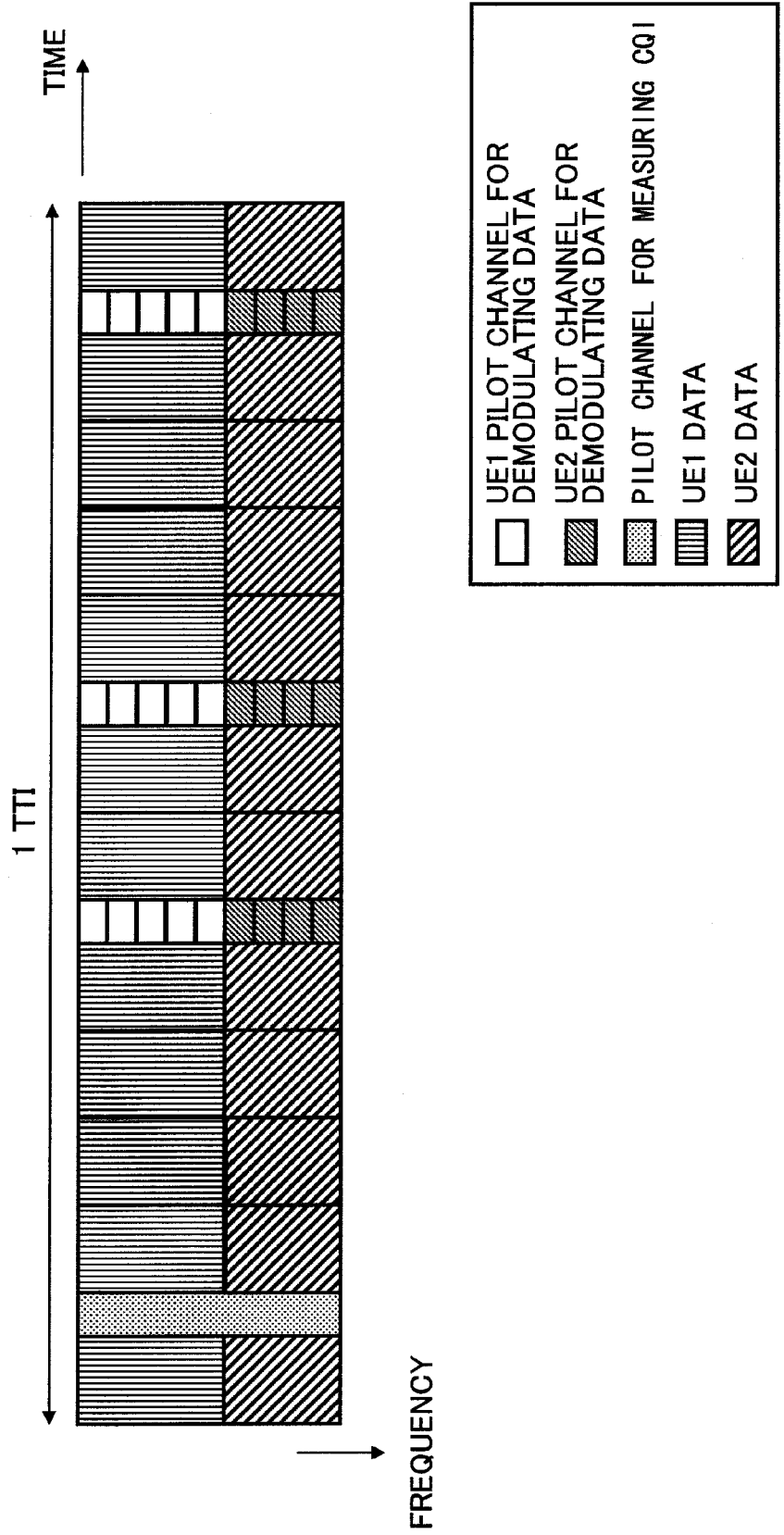
FIG. 7 is an explanatory view illustrating an example of mapping a data channel, a pilot channel for demodulating a data channel, and a pilot channel for measuring a CQI in a user terminal apparatus according to the example of the present invention.

Next, the base station apparatus 200 according to an example of the present invention is explained in reference to FIG. 6.

The base station apparatus 200 according to this example includes a CAZAC code generation portion 202, a cyclic shift portion 204, a discrete Fourier Transform portion (DFT) 206, a sub-carrier mapping portion 208, an inverse Fast Fourier Transform (IFFT) 210, a reception timing estimation portion 212, a channel estimation/CQI measurement portion 214, a duplexer 216, an RF reception circuit 218, a Fast Fourier Transform portion (FFT) 220, a sub-carrier demapping portion 222, a frequency domain equalizing portion 224, an inverse discrete Fourier Transform portion (IDFT) 226, a demodulation portion 228, a scheduler 230, and a code information setting portion 232.

The CAZAC code generation portion 202 generate a CAZAC code in accordance with an identifier of a CAZAC code set by the code information setting portion 232 (described later).

The cyclic shift portion 204 rearranges the CAZAC code sequence in a cyclic manner in accordance with a cyclic shift amount set by the code information setting portion 232.

The discrete Fourier Transform portion (DFT) 206 carries out the discrete Fourier Transform and thus transforms the time series information into the frequency domain information.

The sub-carrier mapping portion 208 carries out mapping in the frequency domain. For example, the sub-carrier mapping portion 208 carries out mapping the pilot channel and/or the pilot channel for measuring the CQI in accordance with the transmission method set by the code information setting portion 232.

The transmission method includes the frequency division multiplexing (FDM) method for multiplexing plural user terminal apparatuses. In this case, the sub sub-carrier mapping portion 208 maps the pilot channel and/or the pilot channel for measuring the CQI in accordance with the transmission band. There are two types of the FDM methods: one is a localized FDM method and the other is a distributed FDM method. In the localized FDM method, a continuous band, namely, continuous sub-carriers are assigned to each user in the frequency axis. In the distributed FDM method, sub-carriers distributed throughout the frequency band are assigned.

The inverse Fast Fourier Transform portion (IFFT) 210 carries out the inverse Fourier Transform and thus reverts the frequency domain signal to the time domain signal. As a result, a pilot signal replica is generated. The pilot signal replica is input to the reception timing estimation portion 212 and the channel estimation/CQI measurement portion 214.

The duplexer 216 appropriately keeps the transmission signal and the reception signal separated in order to realize full-duplex communications.

The RF reception circuit 218 carries out a digital to analog conversion process, a frequency conversion process, a band limitation process and the like in order to process the reception symbols in a base band.

The reception timing estimation portion 212 estimates the reception timing through correlation detection between the pilot channel and the pilot channel replica in accordance with the pilot channel in the reception signal.

The Fast Fourier Transform portion (FFT) 220 carries out the Fourier Transform in accordance with the estimated reception timing and thus transforms the time series information into the frequency domain information.

The channel estimation/CQI measurement portion 214 measures the CQI from the output signal of the Fast Fourier Transform portion (FFT) 220, carries out the channel estimation by subtracting the pilot signal replica from the output signal, and outputs information for carrying out channel compensation.

The sub-carrier demapping portion 222 carries out demapping in the frequency domain. This process is carried out corresponding to the mapping in the frequency domain carried out in the individual user terminal apparatuses.

The frequency domain equalizing portion 224 carries out equalizing the reception signal in accordance with the channel estimation value.

The inverse discrete Fourier Transform portion (IDFT) 226 carries out the inverse discrete Fourier Transform and thus reverts the frequency domain signal to the time domain signal. The demodulation portion 228 demodulates the reception signal.

The scheduler 230 determines a downlink resource assignment in accordance with a downlink channel quality indicator (CQI) or other determination criteria. In addition, the scheduler 230 determines an uplink resource assignment in accordance with a reception result of the pilot channel for measuring the CQI transmitted from each user terminal apparatus or other determination criteria. These determined assignments are output as scheduling information. The scheduling information specifies frequency, time, transmission format (data modulation method, channel coding rate, and the like) and the like to be used in transmitting a signal.

The code information setting portion 232 specifies code information including parameters to be used in uplink by the user terminal apparatus, for example, a sequence number indicating a CAZAC code, a cyclic shift amount, a usable frequency band and the like, in accordance with the assignment result by the scheduler 230. The code information may be commonly sent to each user terminal apparatus through a broadcasting channel, or individually sent to each user terminal apparatus. In the former case, each user terminal apparatus is required to uniquely derive the specific code information for the user terminal apparatus of its own from the broadcast information.

Next, a user terminal according to a second example of the present invention is explained.

The user terminal according to this example has the same configuration as the user terminal explained in reference to FIG. 3.

A user terminal apparatus 100 according to this example multiplexes the pilot channel for demodulating the data channel and the pilot channel for measuring the CQI to different blocks, in other word, different short blocks, as shown in FIG.

7. For example, the pilot channel for measuring the CQI is multiplexed to one short block in a TTI, and the pilot channel for demodulating the data channel is multiplexed to the remaining short blocks. By using only the short blocks in transmitting the pilot channels, the overhead can be reduced.

From the viewpoint of channel estimation, the short block for transmitting the measuring of the CQI is preferably a second (or a third) short block in the TTI.

In addition, because the pilot channel for demodulating the data channel and the pilot channel for measuring the CQI does not coexist in the same short block, namely, the distributed FDM is not used, the number of sequences of the pilot channel for demodulating the data channel can be larger.

Specifically, the sub-carrier mapping portion 108 maps data to the long block and the sub-carrier mapping portion 120 maps data and the pilot channel for measuring the CQI to the short block.

Next, a user terminal according to a third example of the present invention is explained.

The user terminal according to this example has the same configuration as the user terminal explained in reference to FIG. 3.

Figure 8:
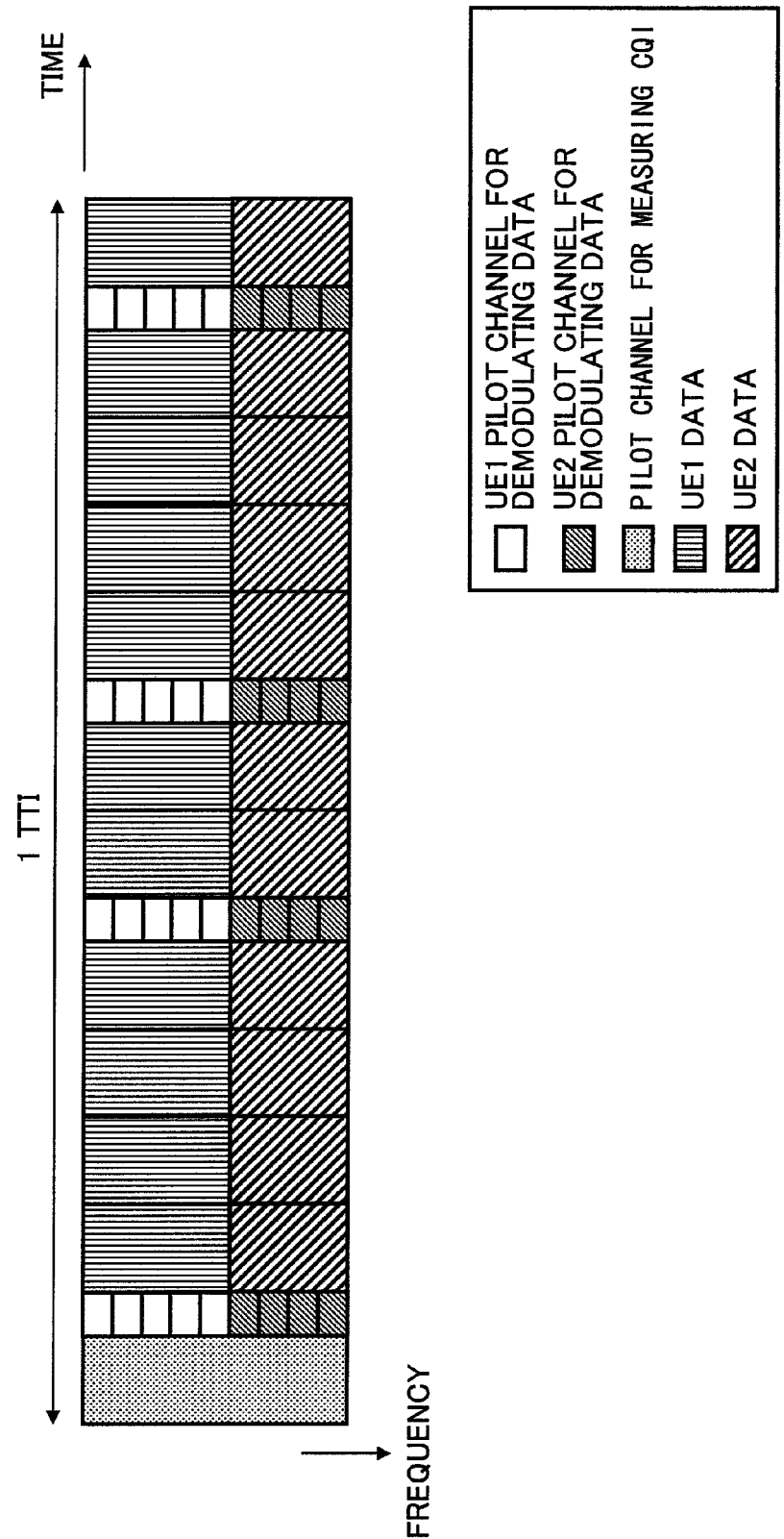
FIG. 8 is an explanatory view illustrating an example of mapping a data channel, a pilot channel for demodulating a data channel, and a pilot channel for measuring a CQI in a user terminal apparatus according to the example of the present invention.
Figure 9:
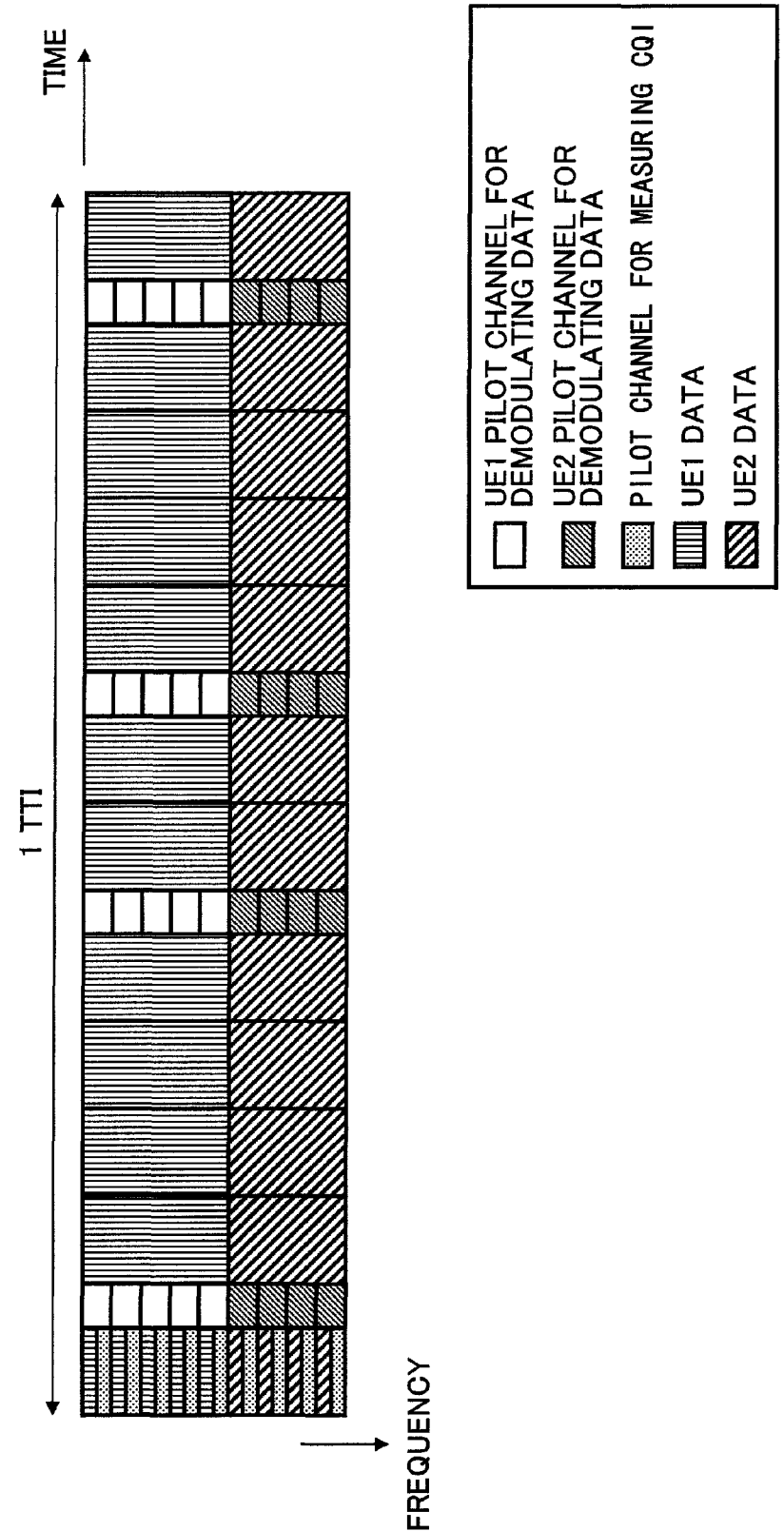
FIG. 9 is an explanatory view illustrating an example of mapping a data channel, a pilot channel for demodulating a data channel, and a pilot channel for measuring a CQI in a user terminal apparatus according to the example of the present invention.

A user terminal apparatus 100 according to this example multiplexes the pilot channel for demodulating the data channel and the pilot channel for measuring the CQI to different blocks, as shown in FIG. 8. In other words, the user terminal apparatus 100 multiplexes the pilot channel for demodulating the data channel to the short block, and the pilot channel for measuring the CQI to the long block. For example, the short block is used to transmit the pilot channel for demodulating the data channel, and the long block in one TTI is used to transmit the pilot channel for measuring the CQI. With this, because the pilot channel for measuring the CQI is assigned to one long block, the number of sequences of the pilot channel for measuring the CQI can be larger. In addition, because the pilot channel for demodulating the data channel and the pilot channel for measuring the CQI do not coexist in the same short block, namely, the distributed FDM is not used, the number of sequences of the pilot channel for demodulating the data channel can be larger, thereby improving the channel estimation accuracy.

Specifically, the sub-carrier mapping portion 108 maps data and the pilot channel for measuring the CQI to the long block, and the sub-carrier mapping portion 120 maps the pilot channel for demodulating the data channel to the short block.

Next, a user terminal according to a fourth example of the present invention is explained.

The user terminal according to this example has the same configuration as the user terminal explained in reference to FIG. 3.

A user terminal apparatus 100 according to this example multiplexes the pilot channel for demodulating the data channel and the pilot channel for measuring the CQI to different blocks. In other words, the user terminal apparatus 100 multiplexes data and the pilot channel for measuring the CQI to the long block, and the pilot channel for demodulating the data channel to the short block. For example, the short block is used to transmit the pilot channel for demodulating the data channel, and one long block in the TTI is used to transmit the pilot channel for measuring the CQI. In order to reduce the overhead, the distributed FDM method is employed for the long block to be used to transmit the pilot channel for measuring the CQI, and the data channel is transmitted through other long blocks except for the long block used to transmit the pilot channel for measuring the CQI.

With this, the overhead can be further reduced compared to the user terminal according to the third example. In addition, because the pilot channel for demodulating the data channel and the pilot channel for measuring the CQI do not coexist in the same short block, namely, the distributed FDM is not used, the number of sequences of the pilot channel for demodulating the data channel can be larger, thereby improving the channel estimation accuracy.

Specifically, the sub-carrier mapping portion 108 maps data and the pilot channel for measuring the CQI to the long block, and the sub-carrier mapping portion 120 maps the pilot channel for demodulating the data channel to the short block.

Next, a user terminal according to a fifth example of the present invention is explained.

The user terminal according to this example has the same configuration as the user terminal explained in reference to FIG. 3.

A user terminal apparatus 100 according to this example multiplexes the pilot channel for demodulating the data channel and the pilot channel for measuring the CQI to the same block.

Figure 10:
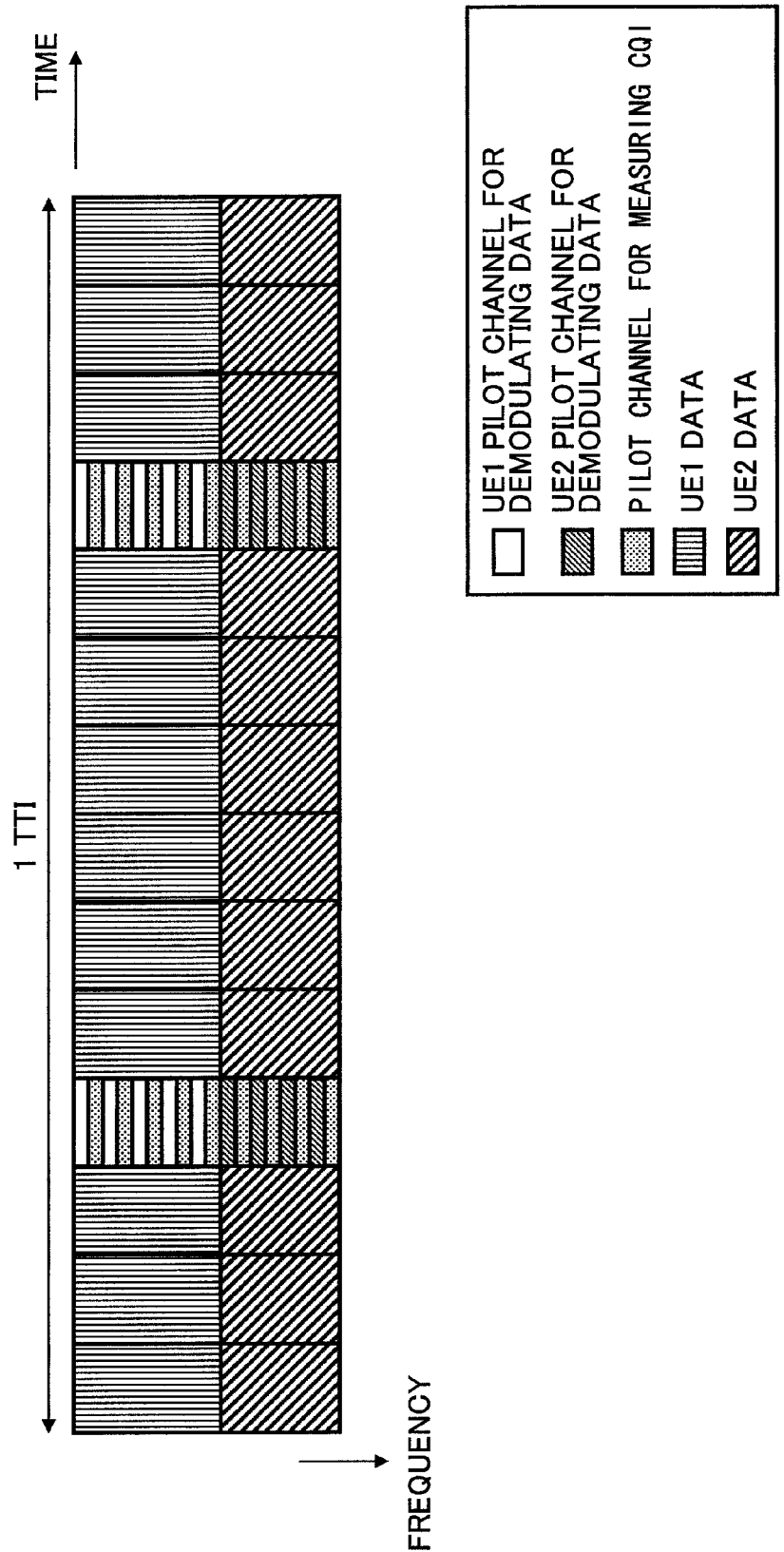
FIG. 10 is an explanatory view illustrating an example of mapping a data channel, a pilot channel for demodulating a data channel, and a pilot channel for measuring a CQI in a user terminal apparatus according to the example of the present invention.

The above-mentioned sub-frame configuration, namely, the sub-frame configuration having the two short blocks and the six long blocks are changed, so that the sub-frame has seven long blocks as shown in FIG. 10 and a center long block is used to transmit the pilot channels.

In order to reduce the overhead, the distributed FDM method is applied to the long block to be used to transmit the pilot channels, and the pilot channel for measuring the CQI and the pilot channel for demodulating data channel are multiplexed.

In this transmission method, when the pilot channels for demodulating the data channel and measuring the CQI are simultaneously transmitted to a user that is transmitting data, the pilot channel for measuring the CQI is preferentially transmitted. In this case, channel estimation can be carried out using a part of the pilot channel for measuring the CQI.

With this, the overhead of the pilot channels can be reduced. In addition, because the pilot channel for measuring the CQI and the pilot channel for demodulating the data channel can be transmitted using the two long blocks in one TTI, the number of sequences of the pilot channel for measuring the CQIs and the pilot channel for demodulating the data channel can be larger, thereby improving the channel estimation accuracy.

Specifically, the sub-carrier mapping portion 108 maps the data channel to a predetermined long block, and the sub-carrier mapping portion 120 maps the pilot channel for measuring the CQI and the pilot channel for demodulating the data channel to a long block except for the long block to which the data channel is multiplexed.

Next, a user terminal according to a sixth example of the present invention is explained.

The user terminal according to this example has the same configuration as the user terminal explained in reference to FIG. 3.

Figure 11:
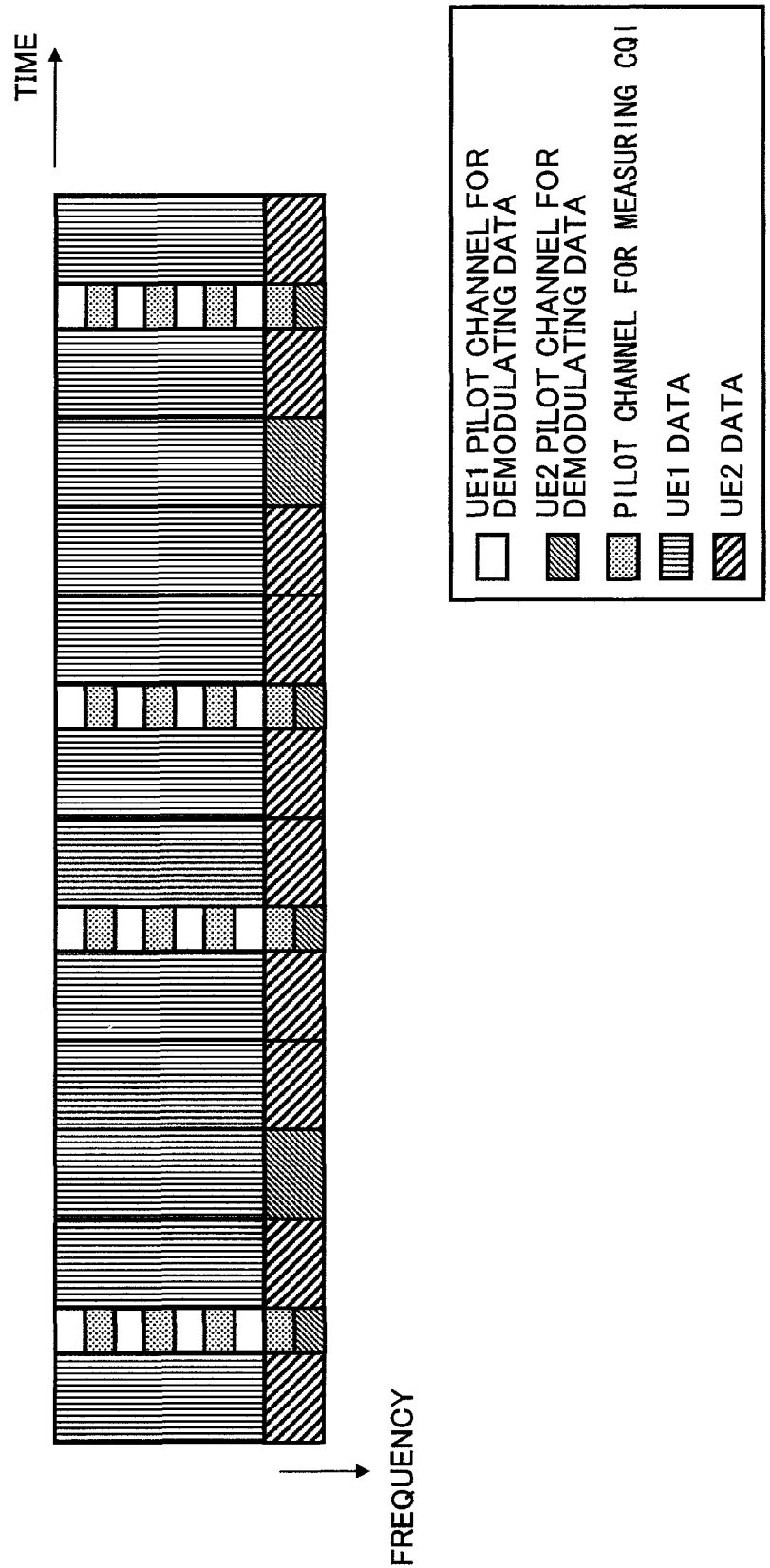
FIG. 11 is an explanatory view illustrating an example of mapping a data channel, a pilot channel for demodulating a data channel, and a pilot channel for measuring a CQI in a user terminal apparatus according to the example of the present invention.
Figure 12:
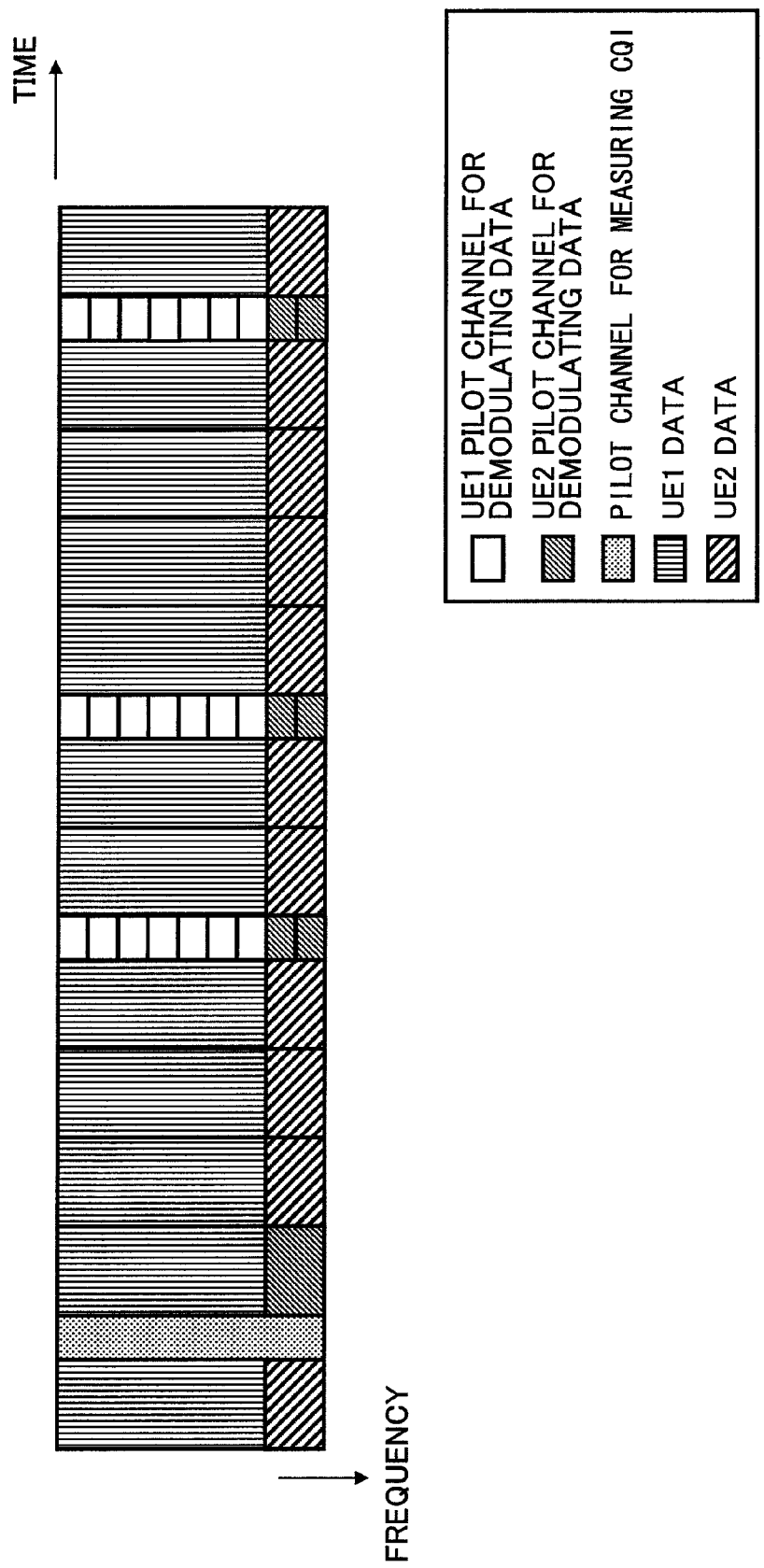
FIG. 12 is an explanatory view illustrating an example of mapping a data channel, a pilot channel for demodulating a data channel, and a pilot channel for measuring a CQI in a user terminal apparatus according to the example of the present invention.

A user terminal apparatus 100 according to this example uses one long block in order to transmit the pilot channels at the time of narrow band transmission, in the user terminal apparatus 100 according to the first and the second examples, as shown in FIGS. 11 and 12. With this, the reception signal power of the pilot channels can be increased, thereby improving the channel estimation accuracy. In addition, the number of sequences in the pilot signals can be larger. Because an issue of the number of the sequences is significant, especially at the time of narrow band transmission, it is greatly advantageous that the number of the sequences be increased at the time of narrow band transmission.

In addition, when configured in such a manner, the overhead is increased in only a user that transmits in a narrow band, and the pilot overheads of other users are not increased. Therefore, such a configuration can be applied without exerting an influence on the other users.

Specifically, the sub-carrier mapping portion 108 maps the data channel to the long block, the sub-carrier mapping portion 120 maps the pilot channel for demodulating the data channel and the pilot channel for measuring the CQI to the short and the long blocks.

Figure 13:
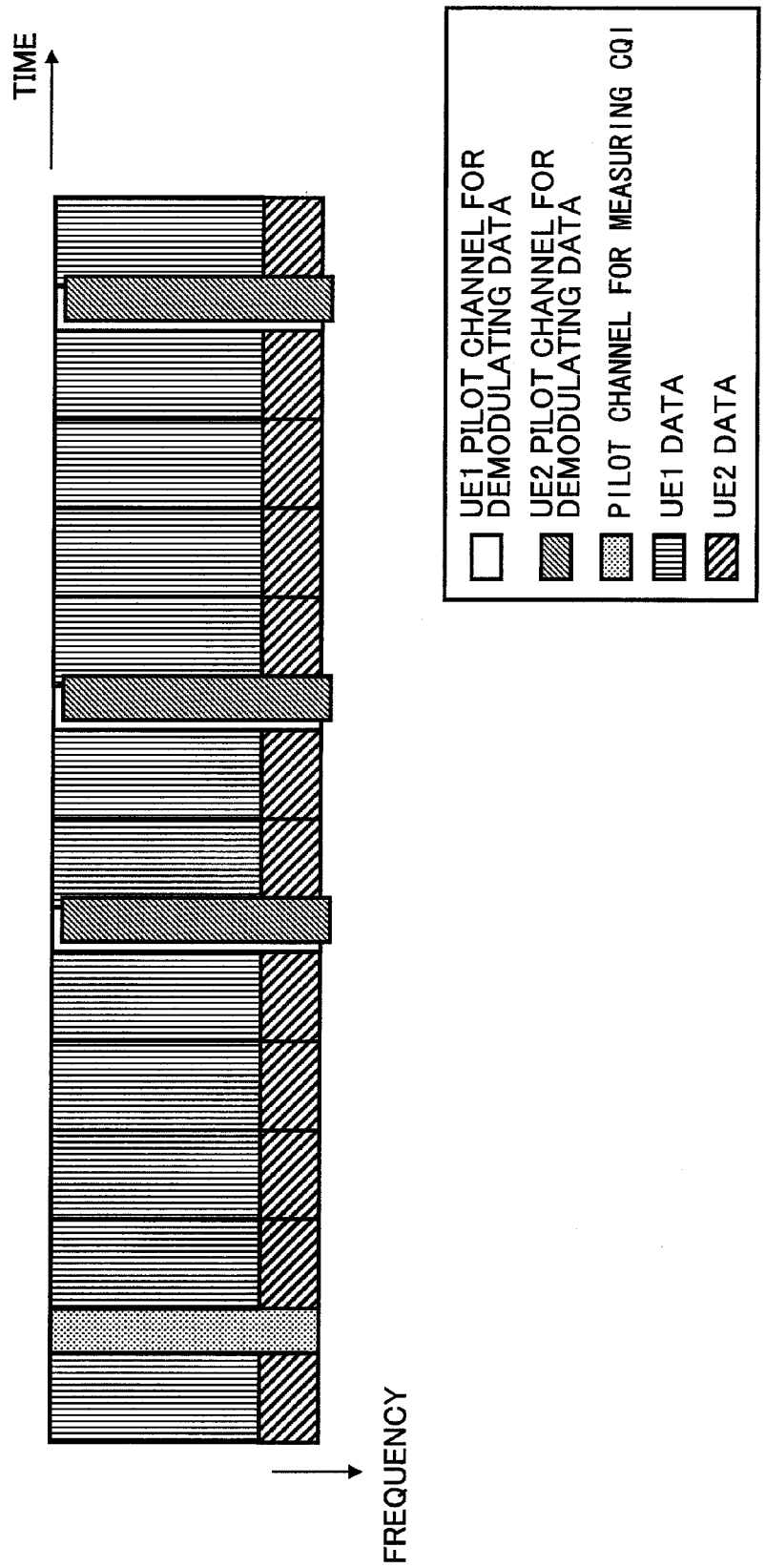
FIG. 13 is an explanatory view illustrating an example of mapping a data channel, a pilot channel for demodulating a data channel, and a pilot channel for measuring a CQI in a user terminal apparatus according to the example of the present invention.

In addition, the pilot channel for demodulating the data channel may be transmitted using a bandwidth wider than the bandwidth of the data channel at the time of narrow band transmission. Specifically, as shown in FIG. 13, the CDM method is applied to the pilot channel for demodulating the data channel, which is assigned to a UE1, and the pilot channel for demodulating the data channel, which is assigned to a UE2, in a band having the same bandwidth as the bandwidth of the bands assigned to the UE1 and the UE2. In this case, the users are multiplexed by an orthogonal CDM using CAZAC code shifting.

With this, because the pilot channels are transmitted in the wider band, the number of sequences of the pilot signals can be larger.

Figure 14:
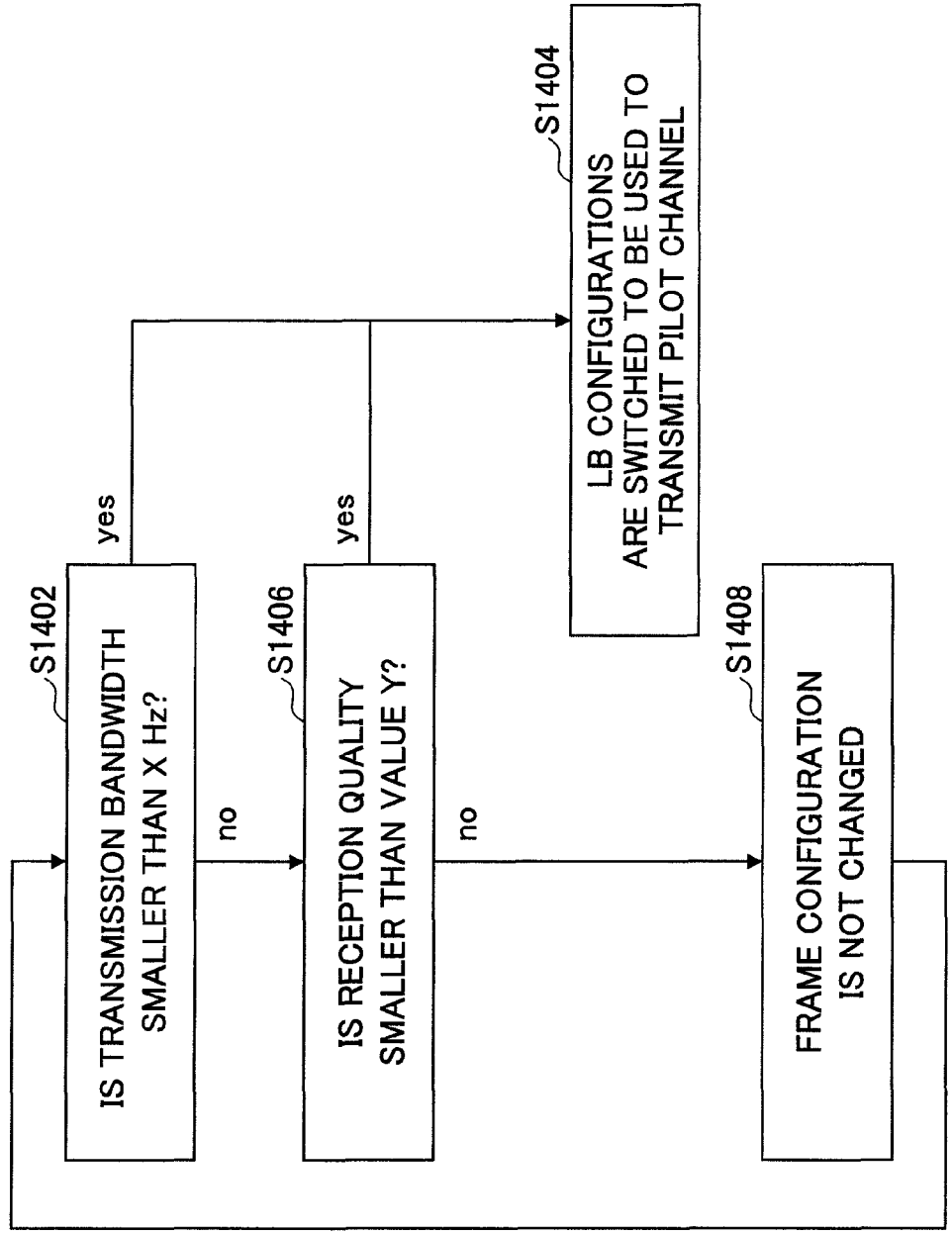
FIG. 14 is an explanatory view illustrating an example of mapping a data channel, a pilot channel for demodulating a data channel, and a pilot channel for measuring a CQI in a user terminal apparatus according to the example of the present invention.

Operations of the user terminal apparatus according to this example are explained in reference to FIG. 14.

In order to determine whether the pilot channel is transmitted through the long block in a bandwidth assigned by the base station apparatus, a threshold value X of the bandwidth and a threshold value Y of the reception quality are determined in advance. In addition, a frame configuration used when the pilot channel is transmitted through the long block is also determined in advance.

The sub-carrier mapping portions 108 and 120 determine whether a transmission bandwidth is smaller (narrower) than the threshold value X in accordance with the information indicating the transmission bandwidth, the information being included in the code information transmitted from the base station 200 (step S1402).

When the notified transmission bandwidth is smaller than the bandwidth threshold X (step S1402: YES), the sub-carrier mapping portions 108 and 120 change configurations of the long block so that the long block is used to transmit the pilot channel (step S1404).

On the other hand, when the notified transmission bandwidth is not smaller than the bandwidth threshold X (step S1402: NO), the sub-carrier mapping portions 108 and 120 determine whether the reception quality is less than the required threshold Y (step S1406).

When the reception quality is less than the required threshold Y (step S1406: YES), the sub-carrier mapping portions 108 and 120 change configurations of the long block so that the long block is used to transmit the pilot channel (step S1404).

On the other hand, when the reception quality is not less than the required threshold value Y (step S1406: NO), the sub-carrier mapping portions 108 and 120 determine that the frame configuration is not changed (step S1408).

Next, a user terminal according to a seventh example of the present invention is explained.

The user terminal according to this example has the same configuration as the user terminal explained in reference to FIG. 3.

Figure 15:
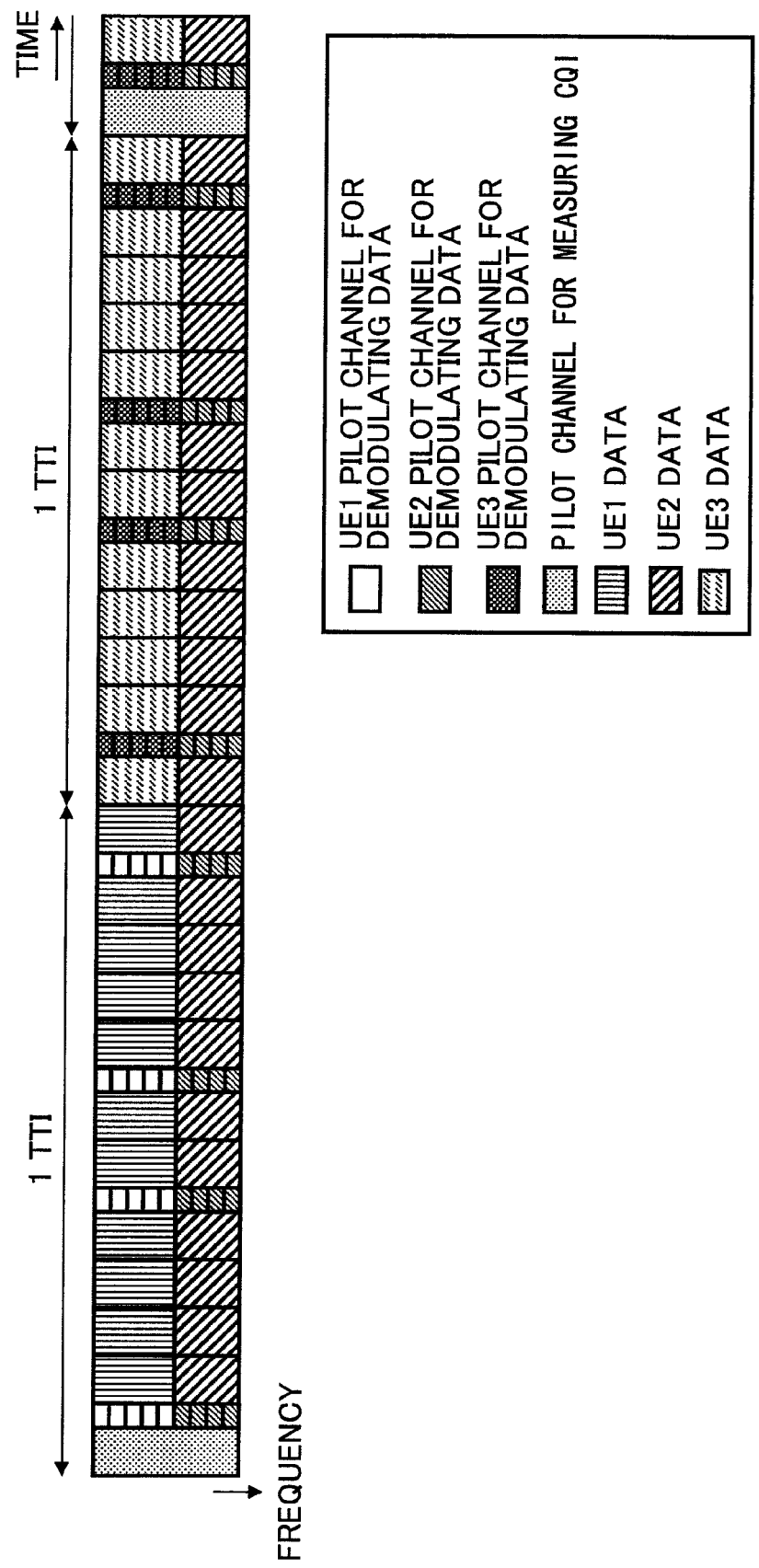
FIG. 15 is an explanatory view illustrating an example of mapping a data channel, a pilot channel for demodulating a data channel, and a pilot channel for measuring a CQI in a user terminal apparatus according to the example of the present invention.

A user terminal apparatus 100 according to this example multiplexes the pilot channel for demodulating the data channel and the pilot channel for measuring the CQI to different blocks, as shown in FIG. 15. In other words, the pilot channel for the demodulating the data channel is multiplexed to the short block, and the pilot channel for measuring the CQI is multiplexed to the long block. For example, the short block is used to transmit the pilot channel for demodulating the data channel, and one long block in the TTI is used to transmit the pilot channel for measuring the CQI. The pilot channel for measuring the CQI is multiplexed in every plural TTIs, for example, every two TTIs. The long blocks through which the pilot channel for measuring the CQI is not transmitted are used to transmit the data channel.

Figure 16:
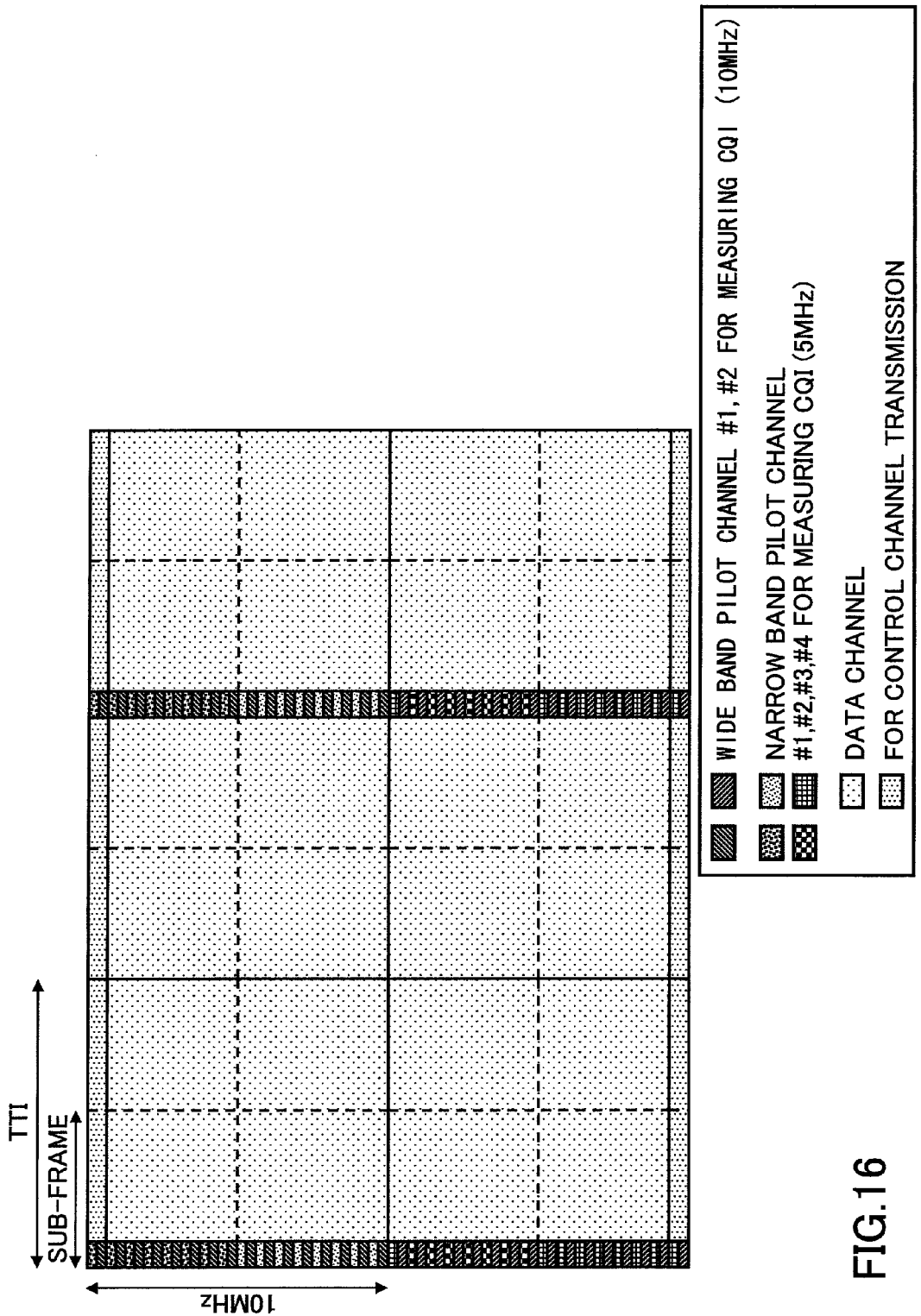
FIG. 16 is an explanatory view illustrating an example of mapping a data channel, a pilot channel for demodulating a data channel, and a pilot channel for measuring a CQI in a user terminal apparatus according to the example of the present invention.

For example, as shown in FIG. 16, a beginning block in every two frames is used to transmit the pilot channel for measuring the CQI. FIG. 16 illustrates two types of bandwidths of the pilot channels for measuring the CQIs, for example, 5 MHz and 10 MHz. In FIG. 16, the pilot channel for demodulating the data channel is omitted. The transmission bandwidth of the pilot channel for measuring the CQI is determined by a path loss (range attenuation) between the base station and the mobile station or limitation in a transmittable bandwidth of the mobile station. The distributed FDMA is applied to multiplexing the pilot channels for measuring the CQIs that have different bandwidths. The pilot channels for measuring the CQIs that have the identical bandwidth are multiplexed by the orthogonal CDMA, or may be multiplexed by the localized FDMA. When the transmittable bandwidth of the mobile station is 20 MHz, frequency hopping is applied to the pilot channel of 10 MHz for measuring the CQI, and the channel quality of 20 MHz is measured over the two TTIs.

With this, because the pilot channel for measuring the CQI is assigned to one long block, the number of the sequences of the pilot channel for measuring the CQI can be larger. In addition, the pilot channels for demodulating the data channel may be transmitted by using the four short blocks in one TTI, thereby improving the channel estimation accuracy. Moreover, the overhead of the pilot channels, especially the pilot channel for measuring the CQI can be reduced.

Specifically, the sub-carrier mapping portion 108 maps the data channel and the pilot channel for measuring the CQI to the long block, and the sub-carrier mapping portion 120 maps the pilot channel for demodulating the data channel to the short block.

Next, a user terminal according to an eighth example of the present invention is explained.

The user terminal according to this example has the same configuration as the user terminal explained in reference to FIG. 3.

A user terminal apparatus 100 according to this example multiplexes the pilot channels of plural users for measuring the CQI in accordance with the transmission method included in the code information transmitted from the base station apparatus 200, as shown in FIG. 17. Specifically, a hybrid multiplexing method including TDMA/CDMA/FDMA may be applied to the user terminal apparatus 100.

When the transmission timing information is transmitted from the base station apparatus 200, the user terminal apparatus 100 multiplexes the pilot channels of the plural users by the Time Division Multiple Access (TDMA) within the transmission interval, namely, by grouping the plural users per block and transmits the multiplexed pilot channels.

When the transmission timing information, the transmission band information, and the CAZAC sequence cyclic shift amount information are transmitted from the base station apparatus 200, the user terminal apparatuses 100 transmit the pilot channels of plural users for measuring the CQI to be transmitted in the same transmission band in the same block, namely in the short block or the long block, by Code Division Multiple Access (CDMA), specifically the orthogonal CDMA using the CAZAC sequence cyclic shift.

When the transmission timing information and the transmission band information are transmitted from the base station apparatus 200, the pilot channels of plural users for measuring the CQIs to be transmitted in different transmission bands are multiplexed in the same block, namely in the short block or the long block by the localized FDMA.

Next, a user terminal according to a ninth example of the present invention is explained.

The user terminal according to this example has the same configuration as the user terminal explained in reference to FIG. 3.

A user terminal apparatus 100 according to this example applies frequency hopping to the pilot channel for measuring the CQIs, as shown in FIG. 18. The frequency hopping is carried out within a TTI, and the data channels are transmitted through unoccupied resources. By applying the frequency hopping, the overhead of the pilot channels can be reduced.

While the present invention has been described separately as individual examples for simplicity of explanation, the individualities are not essential to the present invention, and one or more of the examples may be practiced when necessary. In addition, while the present invention has been described by using specific values in order to facilitate the understanding of the present invention, those values are merely examples and various values may be used unless otherwise noted.

In the foregoing, while the present invention has been described in reference to specific examples, each example is merely exemplified. It should be readily understood by a person having ordinary skill in the art that alteration, modification, or replacement and substitution of elements may be possible in various ways within the scope of the present invention. In addition, although the apparatuses according to the examples are explained in reference to a functional block diagram, such apparatuses may be realized by hardware, software, or their combination. The present invention is not limited to the above examples, but may include alteration, modification, replacement and substitution of various elements, without departing the scope of the present invention.

This international patent application is based on Japanese Priority Application No. 2006-298314, filed on Nov. 1, 2006, with the Japanese Patent Office, the entire contents of which are hereby incorporated by reference.

The invention claimed is:

1. A user terminal apparatus that transmits to a base station apparatus a pilot channel at least in uplink by a single carrier method, the user terminal apparatus comprising:
a mapping portion that maps a transmission data to a long block of a sub-frame composed of plural short blocks and plural of the long blocks, and maps a pilot channel for demodulating a data channel and a pilot channel for measuring a CQI to the short blocks in accordance with a transmission band and a transmission method notified from the base station,
wherein the mapping portion maps the pilot channel for demodulating the data channel to the long block when a notified transmission bandwidth is less than a predetermined threshold value.

2. The user terminal apparatus as claimed in claim 1, wherein the mapping portion multiplexes the pilot channel for demodulating the data channel and the pilot channel for measuring the CQI to the same short block.

3. The user terminal apparatus as claimed in claim 2, wherein the long block has a transmission time longer than the short block, and
wherein the mapping portion maps the pilot channel for demodulating the data channel and the pilot channel for measuring the CQI to continuous short blocks.

4. The user terminal apparatus as claimed in claim 1, wherein the mapping portion maps the pilot channel for demodulating the data channel and the pilot channel for measuring the CQI to different short blocks.

5. The user terminal apparatus as claimed in claim 1, wherein the mapping portion maps the pilot channel for demodulating the data channel to a bandwidth larger than a bandwidth through which the data channel is transmitted.

6. The user terminal apparatus as claimed in claim 1, wherein the pilot channel for measuring the CQI is time division multiplexed in predetermined transmission intervals.

7. The user terminal apparatus as claimed in claim 1, wherein the pilot channel for measuring the CQI is code division multiplexed in predetermined transmission intervals.

8. The user terminal apparatus as claimed in claim 1, wherein the pilot channel for measuring the CQI is frequency division multiplexed in predetermined transmission intervals.

9. A user terminal apparatus that transmits to a base station a pilot channel at least in uplink by a single carrier method, the user terminal apparatus comprising:
a mapping portion that maps transmission data and a pilot channel for measuring a CQI to a long block of a sub-frame composed of plural short blocks and plural of the long blocks, and maps a pilot channel for demodulating a data channel to the short blocks in accordance with a transmission band and a transmission method notified from the base station,
wherein the mapping portion maps the pilot channel for demodulating the data channel to the long block when a notified transmission bandwidth is less than a predetermined threshold value.

10. The user terminal apparatus as claimed in claim 9, wherein the mapping portion multiplexes the transmission data and the pilot channel for measuring the CQI to the same long block.

11. The user terminal apparatus as claimed in claim 9, wherein the mapping portion multiplexes the transmission data and the pilot channel for measuring the CQI to different long blocks.

12. The user terminal apparatus as claimed in claim 9, wherein a TTI is composed of plural of the sub-frames, and
wherein the mapping portion maps the pilot channel for measuring the CQI so that a frequency band for transmitting the pilot channel for measuring the CQI within the TTI is changed.

13. The user terminal apparatus as claimed in claim 9, wherein a TTI is composed of plural of the sub-frames, and
wherein the mapping portion multiplexes the pilot channels every plural TTIs.

14. A base station apparatus that receives pilot channels from plural users at least in uplink by a single carrier method, wherein radio resources are assigned to corresponding user terminal apparatuses in accordance with corresponding pieces of information on channel qualities in the corresponding terminal apparatuses, the base station apparatus comprising:
a parameter determination portion that determines a parameter so that the pilot channels are orthogonal with each other among the user terminal apparatuses existing in a cell covered by the base station; and
a notifying portion that notifies each of the user terminal apparatuses of the parameter, such that each of the user terminal apparatuses maps, based on the parameter, transmission data and a pilot channel for measuring a CQI to a long block and maps a pilot channel for demodulating a data channel to a short block.

15. The base station apparatus as claimed in claim 14, wherein the parameter includes an identifier of a CAZAC code, a cyclic shift amount, and transmission band information.

* * * * *